United States Patent
Alodhayb et al.

(10) Patent No.: US 10,871,580 B1
(45) Date of Patent: Dec. 22, 2020

(54) METAL OXIDE BASED RADIATION SENSOR

(71) Applicant: KING SAUD UNIVERSITY, Riyadh (SA)

(72) Inventors: Abdullah Nasser Alodhayb, Riyadh (SA); Hamad Abdulaziz Albrithen, Riyadh (SA); Khaled Zouher Shamma, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 16/923,725

(22) Filed: Jul. 8, 2020

(51) Int. Cl.
*G01T 1/16* (2006.01)

(52) U.S. Cl.
CPC .................. *G01T 1/1606* (2013.01)

(58) Field of Classification Search
CPC ...................................................... G01T 1/1606
See application file for complete search history.

(56) References Cited

U.S. PATENT DOCUMENTS

| | | | | |
|---|---|---|---|---|
| 5,760,402 A | * | 6/1998 | Hug | A61B 6/037 250/363.05 |
| 2004/0223884 A1 | * | 11/2004 | Chen | G01N 29/036 422/88 |
| 2004/0235296 A1 | | 11/2004 | Bailey et al. | |
| 2006/0180756 A1 | | 8/2006 | Williford | |
| 2020/0240836 A1 | * | 7/2020 | Becker | G01J 1/04 |

FOREIGN PATENT DOCUMENTS

| CN | 101303239 A | * | 11/2008 |
|---|---|---|---|
| CN | 101718667 A | | 6/2010 |
| CN | 101738355 A | | 6/2010 |

OTHER PUBLICATIONS

S. Mansoor. Gamma induced effects on structual, optical and electrical properties of n-TiO2/p-Si heterojunction. J Mater Sci: Mater Electron (2017) 28:16314-16320.

* cited by examiner

*Primary Examiner* — Marcus H Taningco
(74) *Attorney, Agent, or Firm* — Nath, Goldberg & Meyer; Richard C. Litman

(57) ABSTRACT

A metal oxide based radiation sensor includes a titanium dioxide ($TiO_2$) thin film layer on a microcantilever surface. The $TiO_2$ thin film layer initially comprises anatase and rutile crystal structures. Exposure to radiation, such as gamma radiation, results in changes in structural features and mechanical behaviors of the metal oxide based radiation sensor. In particular, the resonant frequency changes with exposure to radiation dosages. The structural and mechanical behaviors of the metal oxide based radiation sensor change proportionally with dosage within a range of dosages.

16 Claims, 14 Drawing Sheets

METAL OXIDE BASED RADIATION SENSOR

BACKGROUND

1. Field

The disclosure of the present patent application relates to a system for radiation detection and method of detecting. In particular, the disclosure relates to a system comprising metal oxide thin film layers on a micro-cantilever sensitive to radiation exposure.

2. Description of the Related Art

Micro-Eectro-Mechanical Systems (MMS) are miniature machines having a mechanical and electrical component. MEMS are typically small enough to fit on a typical computer chip as a component in the chip circuitry and have dimensions on the order of millimeters, microns or nanometers, depending on application. Micromechanical resonators, such as microcantilevers as sensors, have been utilized in many physical, chemical and medical applications. Various sensing mechanisms have been used to transduce MEMS sensor signals, such as piezoresistance, piezoelectricity, optical modulation, gyroscope principles, capacitance, frequency shift and pressure.

MEMS devices are sensitive to mechanical stress. MEMS-based resonators and cantilevers are capable of ultra-sensitive mass detection, including masses in the atto- to zeptogram ranges. Such MEMS-based sensors can be batch produced using conventional micromachining techniques and offer reduced size, high precision and increased reliability compared to conventional sensors.

Gamma radiation is deeply penetrating and highly energetic electromagnetic radiation. Gamma radiation interaction with materials causes ionization and introduces defects into atomic lattices by atomic displacement. Radiation exposure can affect electrical, optical and physical properties of materials. For example, radiant energy interaction with matter is very important in research or measurement applications, since microstructural properties of matter are changed when exposed to ionizing radiation. The International Commission on Radiological Protection (ICRP) provides a system and useful standards for radiation protection, including medical, occupational, environmental and exposure controls against radiological accidents without unduly limiting the beneficial practices giving rise to radiation exposure. Thus, there exists a significant demand for practical, accurate and portable devices for detection of radiation.

$TiO_2$ films have useful and well-understood optical, electrical, physical and chemical properties. $TiO_2$ films are also inexpensive, nontoxic, highly stable, simple to prepare, transparent to visible light, photocatalytic, useful for electron transport and high in refractive index. Moreover, $TiO_2$ is suitable for applications in ceramic membranes, gas sensors, optical filters, antireflection coatings and photocatalysts. The crystalline structure of $TiO_2$ has three phases: anatase, rutile and brookite. Anatase and rutile each have a tetragonal structure, and brookite, has an orthorhombic structure. $TiO_2$ films may be prepared by various known techniques, including atomic layer deposition, which allows for deposition of $TiO_2$ thin films on substrates with sub-nanometer precision in material thickness, high quality and excellent atomic level control of layer uniformity.

A radiation sensor is desired to solve the aforementioned problems.

SUMMARY

A radiation sensor, described herein as an embodiment of the present subject matter, comprises a substrate, a microcantilever having one end operatively coupled to the substrate; and a metal oxide layer arranged on a surface of the microcantilever, wherein the metal oxide layer comprises the metal oxide in at least one crystal form, the at least one crystal form being capable of transformation to a different form upon exposure to a radiation to be detected. When the radiation sensor is exposed to the radiation to be detected with a dosage within a detectable dosage range, an initial resonant frequency of the microcantilever with the metal oxide layer is shifted by a frequency shift to a second resonant frequency.

Other embodiments include a method of fabricating a radiation sensor of the present specification and methods of using such a radiation sensor to detect radiation and as a dosimeter.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 2:
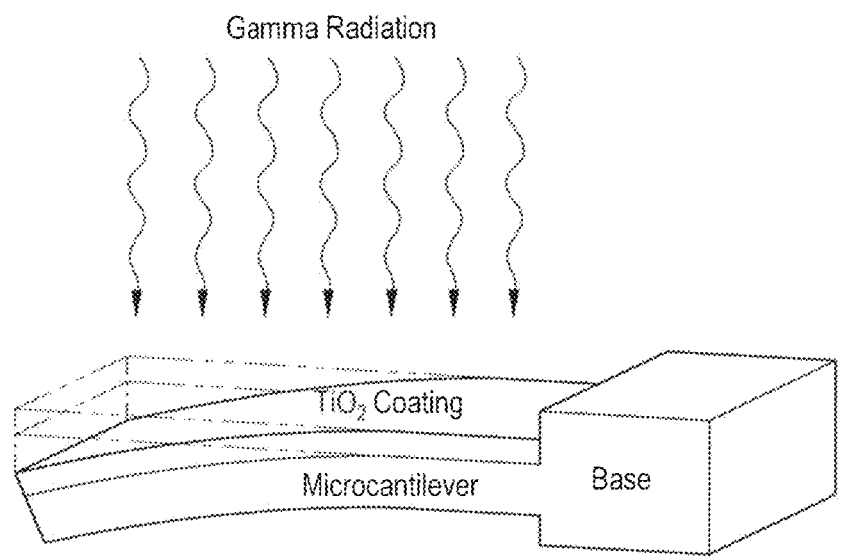
FIG. 2 provides a scheme of the proposed sensor mechanism of the $TiO_2$ thin film coated surface microcantilever.

An embodiment of the present specification is directed to a radiation sensor, shown in FIG. 2, for detecting radiation. The radiation sensor can include a substrate or base, a microcantilever having one end in communication with the substrate, and a metal oxide layer arranged on a surface of the microcantilever. The metal oxide layer can include the metal oxide in at least one crystal form. The at least one crystal form can be capable of transformation to a different form upon exposure to the radiation. When the radiation sensor is exposed to the radiation within a detectable dosage range, an initial resonant frequency of the microcantilever with the metal oxide layer is shifted by a frequency shift to a second resonant frequency. In an embodiment, the metal oxide is titanium dioxide. The at least one crystal form may include rutile, anatase, or both rutile and anatase. In an embodiment, the microcantilever comprises a silicon based material.

In an embodiment, the metal oxide layer has a first average thickness in a direction normal to the surface of the microcantilever on which the metal oxide layer is arranged and the microcantilever has a second average thickness in said direction, and the ratio of the first thickness to the second thickness is between 1:50 and 1:1. In another embodiment, the ratio of the first thickness to the second thickness is between 1:20 and 1:5. The metal oxide layer may be arranged on a part or entirety of a surface of the microcantilever. The metal oxide layer has, in an embodiment, uniform thickness over the surface of the microcantilever on which the metal oxide layer is disposed. The absolute dimensions of the microcantilever and metal oxide layer can be such that the resonant frequency of the microcantilever with metal oxide layer is sensitive to changes due to loss of the metal oxide layer.

The microcantilever is not particularly limited in shape. In one embodiment, the microcantilever is a rectangular prism with a width, length and second average thickness. In this case, the resonant frequency is approximated according to:

$$\omega_0 = (k/m)^{1/2}, \text{ where } k = Et^3w/4l^3$$

where resonant frequency ($\omega_0$) of the bare microcantilever is related to its spring constant (k) and mass (m). E=Young's modulus of Elasticity (a property of the microcantilever material), t=thickness, w=width, and l=length. The dimensions t, w and l of the microcantilever can be chosen such that k above is on the order of the mass of metal oxide arranged on the microcantilever. In particular embodiments, the length of the microcantilever is on the order of mm, i.e., 0.1-10 mm, 0.5-5 mm or 0.5-1 mm. The width of the microcantilever is 10-1000 microns, 50-500 microns or 50-100 microns; and the thickness of the microcantilever is 0.5-10 microns or 1-5 microns. The metal oxide layer may be 10-1000 microns thick, 50-500 microns thick, or 50-200 microns thick.

In an embodiment, the metal oxide layer comprises crystal grains having an initial grain size before exposure to the radiation to be detected and the crystal grains have a second grain size after exposure to the radiation to be detected, wherein the second grain size is smaller than the initial grain size. The crystal grain size may be determined by any typical means of observing and calculating an average grain size, for example by XRD and calculating an average grain size using Scherrer's formula, as will be discussed below, or else direct imaging by SEM, TEM or AFM, for example, and calculating an average area of observed crystal grains.

In another embodiment of the radiation sensor, exposing the radiation sensor to the radiation of a first dosage or a second dosage results in a first frequency shift or a second frequency shift, respectively, such that when the first dosage is greater than the second dosage, the first frequency shift is greater than the second frequency shift.

The radiation to be detected is, in an embodiment, an ionizing radiation, such as radiation in the ultraviolet, x-ray or gamma ranges. In a particular embodiment, the radiation may be a gamma radiation.

In an embodiment, the radiation sensor may be incorporated into a device that further includes a structure such as a chamber for immobilizing the radiation sensor and enclosing the radiation sensor, the chamber being penetrable to the radiation to be detected. In particular, the chamber may have dimensions suitable to be worn on a person. The device may further comprise a means of attaching to a person, such as a clip, a hook, a loop, etc. so that the device may be worn by the person, thereby being useful as a personal dosimeter.

The present subject matter further includes a method for detecting radiation exposure comprising the steps of: measuring a detectable quantity of radiation using the radiation sensor to get a base value prior to exposing the radiation sensor to radiation; measuring the detectable quantity of the radiation sensor to get an exposed value; and calculating a difference between the base value and the exposed value as a change in the detectable quantity of the radiation sensor. The detectable quantity is, in an embodiment, the resonant frequency of the microcantilever.

The present subject matter further includes a method of fabricating a radiation sensor that includes the steps of providing a microcantilever having one end coupled to a substrate, coating a side of the microcantilever with a metal oxide layer, such that the metal oxide layer comprises the metal oxide in at least one crystal form, the at least one crystal form being capable of transformation to a different form upon exposure to a radiation to be detected. In an embodiment, the metal oxide layer is coated on the side of the microcantilever by means of atomic layer deposition. In particular, the metal oxide layer may be between 50-200 nm thick.

It should be understood that the amounts of materials for the methods described herein are exemplary, and appropriate scaling of the amounts are encompassed by the present subject matter, as long as the relative ratios of materials are maintained. As used herein, the term "about," when used to modify a numerical value, means within ten percent of that numerical value.

In the following examples, $TiO_2$ thin films were evaluated as a sensing layer on silicon-based cantilevers for detection of gamma-ray radiation and physically characterized. All samples were exposed to gamma rays produced by $^{60}Co$ at doses ranging between 0 kGy to 40 kGy. The optical properties of silicon wafers coated by a TiO$_2$ thin film, wherein the TiO$_2$ thin film was grown by atomic layer deposition (ALD) at 200° C. to a 100 nm thickness, were examined before and after irradiation using X-ray diffraction (XRD), scanning electron microscopy (SEM) and spectroscopic ellipsometry (SE). Atomic force microscopy (AFM) was performed on the TiO$_2$ thin film coated silicon-based cantilevers to find a resonant frequency shift ($\Delta f_o$) resulting from irradiation of the TiO$_2$ thin films. Morphology and other physical properties of the TiO$_2$ thin films on silicon wafers were examined as imaged by AFM.

X-ray diffraction (XRD) results showed that the TiO$_2$ thin films on silicon wafers initially exhibited a nanocrystalline structure of a mixture of rutile and anatase phases. After irradiation, the TiO$_2$ thin films exhibited a nanocrystalline structure of only anatase. The TiO$_2$ thin films on silicon microcantilevers as exemplary radiation detectors exhibited a resonant frequency shift ($\Delta f_o$) measured in an atomic force microscopy (AFM) system that changed proportionally with radiation doses between 0 kGy and 20 kGy. AFM and SEM images of the TiO$_2$ thin films before and after irradiation supported nanocrystalline structural change detected by XRD.

Spectroscopic ellipsometry measurements showed a proportional relation between TiO$_2$ thin film thickness, roughness and optical constants with irradiation dose when fit using the Cauchy model. Frequency shift ($\Delta f_o$) is a convenient detectable parameter of the proposed dosimeter, in light of the reproducibility and sensitivity of measurements made according to the present methods, but one skilled in the art would understand that other detectable parameters, including crystal grain size, crystal type make-up, film thickness and roughness and optical constants may be used to detect radiation exposure and particularly radiation dosage in the range of a proportional response of the detectable parameter to the radiation dosage. The maximum detectable linear effect of the exemplary TiO$_2$ thin films occurred at a dose of 20 kGy. Thus, the exemplary TiO$_2$ thin films on a microcantilever or other substrate may be used as dosimeters for radiation exposure less than around 20 kGy, making them particularly useful in, for example, personal dosimeters.

The following examples illustrate the present teachings.

EXAMPLES

Example 1

Synthesis of the TiO$_2$ Thin Films on Silicon-Based Substrates

Si (100) wafers (450 micron thickness) and Si microcantilever chips (Micromotive company, Octosensis micro cantilever Arrays Static-mode sensors, model: Octo-500, Cantilever length=450 μm Cantilever width=90 μm, Cantilever thickness=1 t 0.3 μm, initial resonant frequency 4-8 KHz, 8 microcantilevers attached to substrate per chip) were cleaned prior to every experiment using a piranha-etch cleaning procedure [3:1 mixture of sulfuric acid (H$_2$SO$_4$) and 30% hydrogen peroxide (H$_2$O$_2$)]. The substrates were then dried and subject to ozone to remove organic contaminants (PSI) series digital UV benchtop ozone system operated at both 185 nm and 254 nm). TiO$_2$ thin films were deposited on the cleaned Si wafers and eight microcantilevers (CA 1 to 8) of the by atomic layer deposition (ALD) (Beneq TFS 200). Film deposition was carried out at 200° C. and ~17 mbar pressure. The TiO$_2$ thin films were prepared from titanium tetrachloride (TiCl$_4$) and deionized water as precursors. TiCl$_4$ evaporation temperature was held at 25° C., while the deionized water evaporation temperature was held at 20° C. Flow rates of the carrier gas for TiCl$_4$ and deionized water were 150 and 200 sccm, respectively, and pressures were 9 mbar and 8 mbar, respectively. High purity (99.9999%) nitrogen gas was used as a purging and carrying gas. 100 nm thick TiO$_2$ films were formed by performing 2500 deposition cycles.

All samples prepared as above were exposed to gamma source Cobalt-60 (Nordion—model GC-220) with a 5.2714 years half-life and 927.299 Gy/h dose rate. The samples were exposed to different doses of 10, 20, 30 and 40 kGy. The dosage was controlled by controlling the exposure time of the samples inside the radiation gamma cell.

Example 2

Characterization of TiO$_2$ Thin Films Exposed to Radiation

Structural properties of as-deposited and gamma-irradiated TiO$_2$ thin films on Si wafer were evaluated by Scanning Electron Microscope (SEM; JEOL JSM-7600F) and X-Ray Diffractometry (XRD; Rigaku—model Ultima IV) with a CuKα radiation source ($\lambda$=1.5406 Å°) at 40 kV/40 mA. Spectroscopic ellipsometry (WVASE-J. A. Woolam) was used to determine the index of refraction for thickness in the range of 600-2500 nm. Ellipsometry measurements were fit using the Cauchy model. Resonant frequency shift ($\Delta f_o$) for TiO$_2$ thin film coated microcantilevers were investgated by Atomic Force Microscope (AFM; Veeco-Bruker SPMs). AFM was also used to investigate the surface topography and roughness of the as-deposited and irradiated Tio$_2$ thin films on silicon wafers. Scanning Probe Image Processor (SPIP) software was used to process and analyze the AFM images.

Results of Characterization of TiO$_2$ Thin Films Exposed to Radiation

Figure 1:
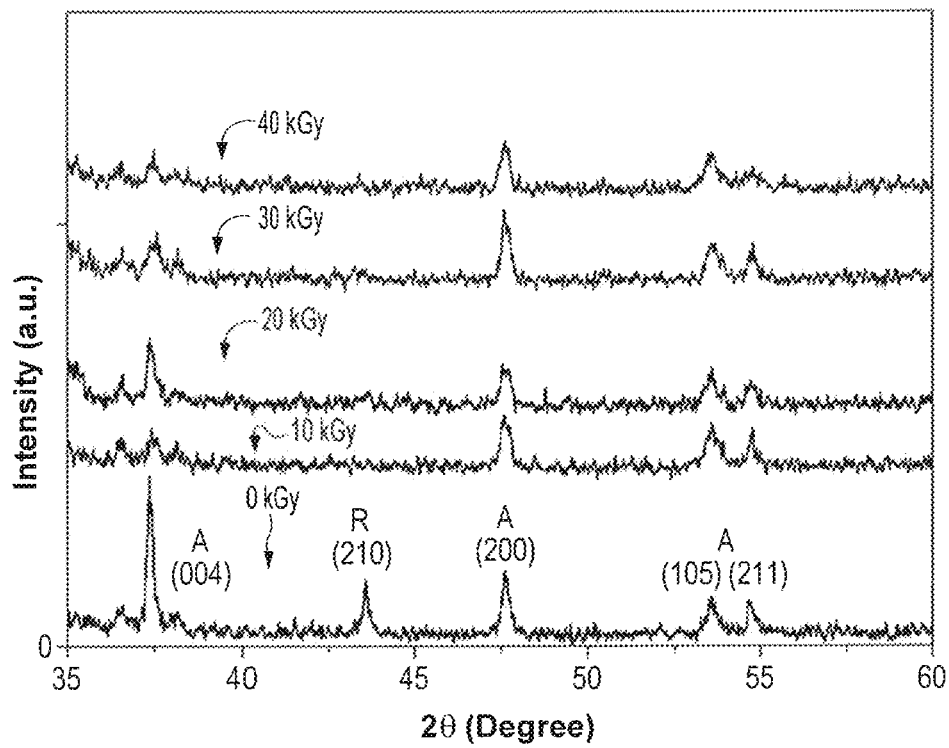
FIG. 1 depicts XRD patterns of the $TiO_2$ thin films on Si substrate produced by ALD at 200° C.: (as-deposited) 0 kGy, 10 kGy, 20 kGy, 30 kGy and 40 kGy.

Xrd Analysis:

XRD analysis was performed on all samples. The scanning angle was changed between 2θ=35°-60°. FIG. 1 represents the XRD patterns for TiO$_2$ thin films 0 kGy (as deposited), 10 kGy, 20 kGy, 30 kGy and 40 kGy. FIG. 1 shows that before irradiation the thin film phases were composed of a mixture of rutile (R) and anatase (A). Anatase phase peaks were observed at 37.802°, 48.052°, 53.89° and 55.059°, corresponding to crystal planes (004), (200), (105) and (211). Only one rutile phase peak observed at 2θ of 44.054° was observed, corresponding to crystal plane (210). After irradiation, the rutile phase peak disappeared, indicating that the irradiated TiO$_2$ thin films change to completely anatase phase TiO$_2$. All peaks observed agree with JCPDS card no. (00-021-1276 and 00-021-1272). The grain size was calculated using Scherrer's expression (C. S. Barret, T. B. Massalski, Structure of Metals, Pergamon Press, Oxford, 1980):

$$D=0.94\lambda/\beta \cos \theta \qquad (1)$$

where D is the average grain size, $\lambda$ is the X-ray wavelength ($\lambda$=1.5406 Å°, Cu-Kα), θ is the diffraction angle and β is the line broadening at half the maximum (FWHM) of the observed diffraction peak. The average grain size of the TiO$_2$ thin films at the strongest peak (004) decreased from 100.9 to 44.1 nm as the gamma dose increased from 0 kGy to 40 kGy.

Figure 3:
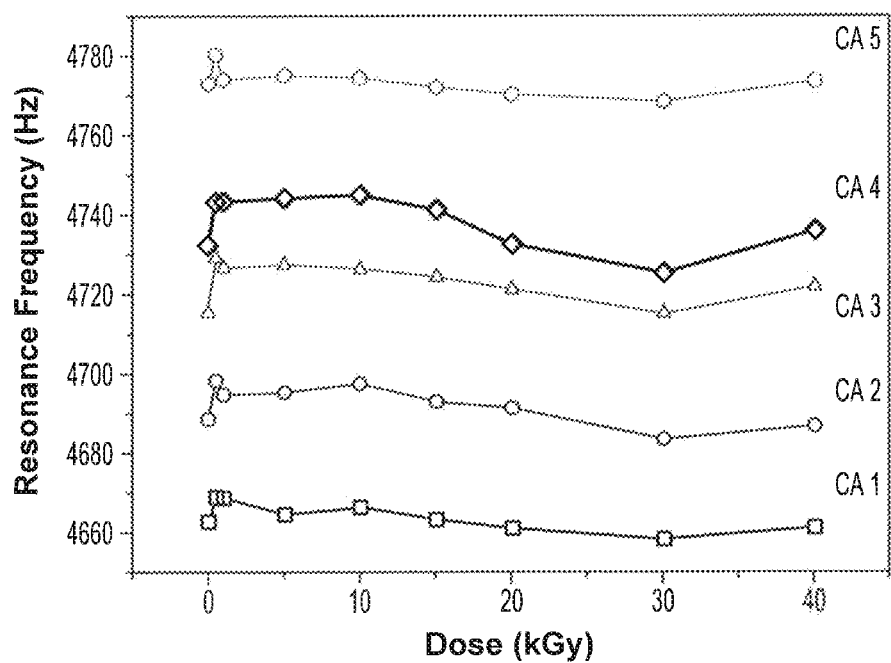
FIG. 3 shows resonant frequencies of Si microcantilevers (CA1-5) without a $TiO_2$ thin film coating layer under varying gamma irradiation doses.
Figure 4A:
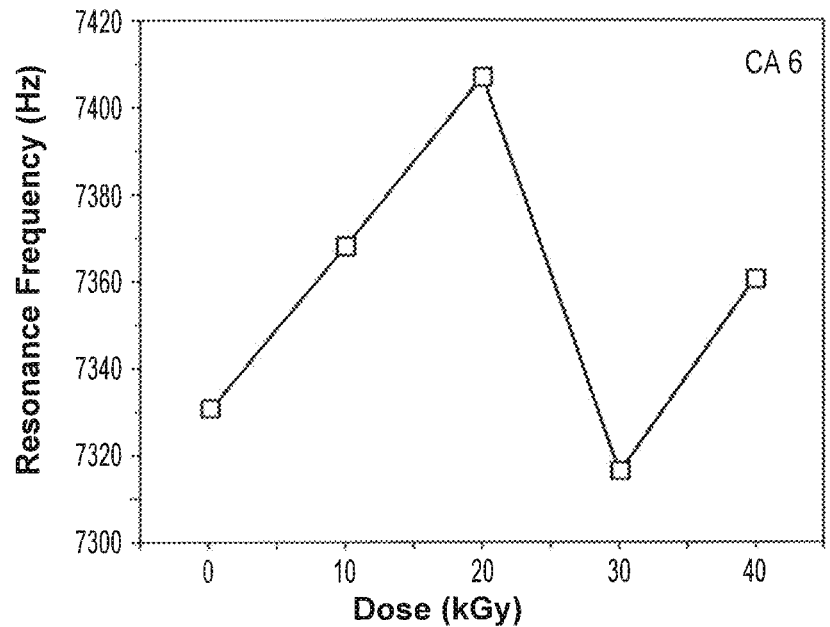
FIGS. 4A-4D show resonant frequencies of $TiO_2$ thin film coated Si microcantilevers for CA6 (FIG. 4A), for CA7 (FIG. 413), for CA8 (FIG. 4D) and the average thereof (FIG. 4C) under gamma irradiation doses from 0-40 kGy.
Figure 4B:
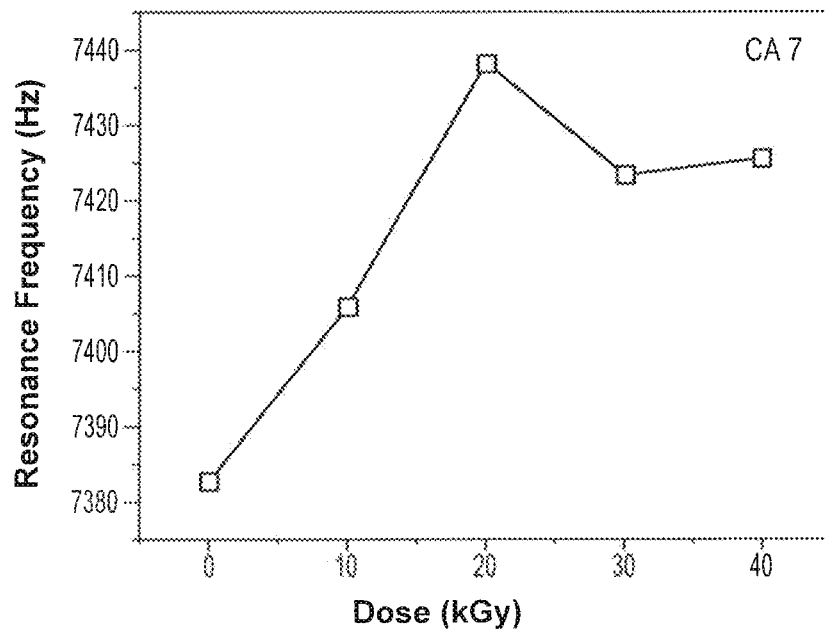
Figure 4C:
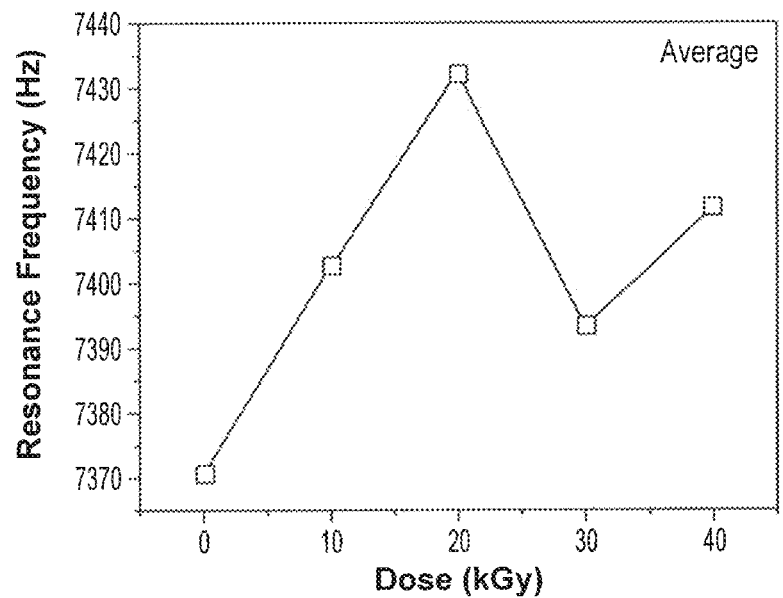
Figure 4D:
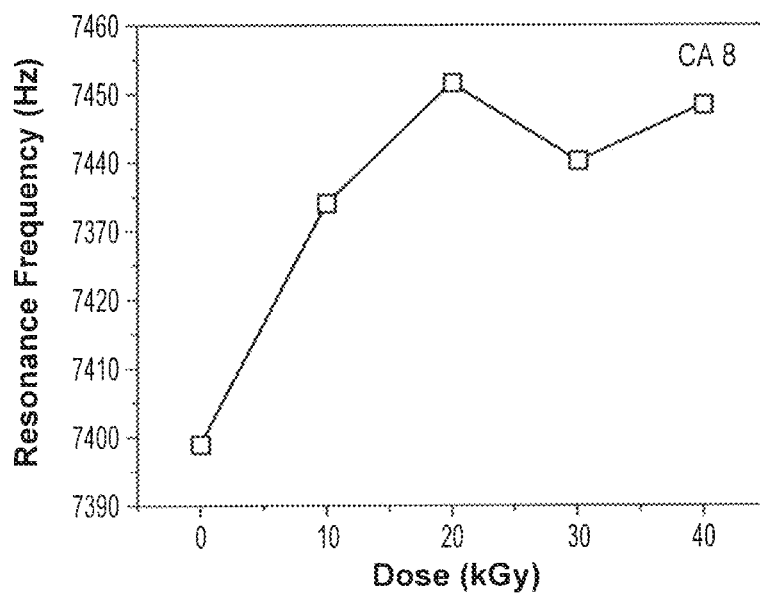
Figure 5:
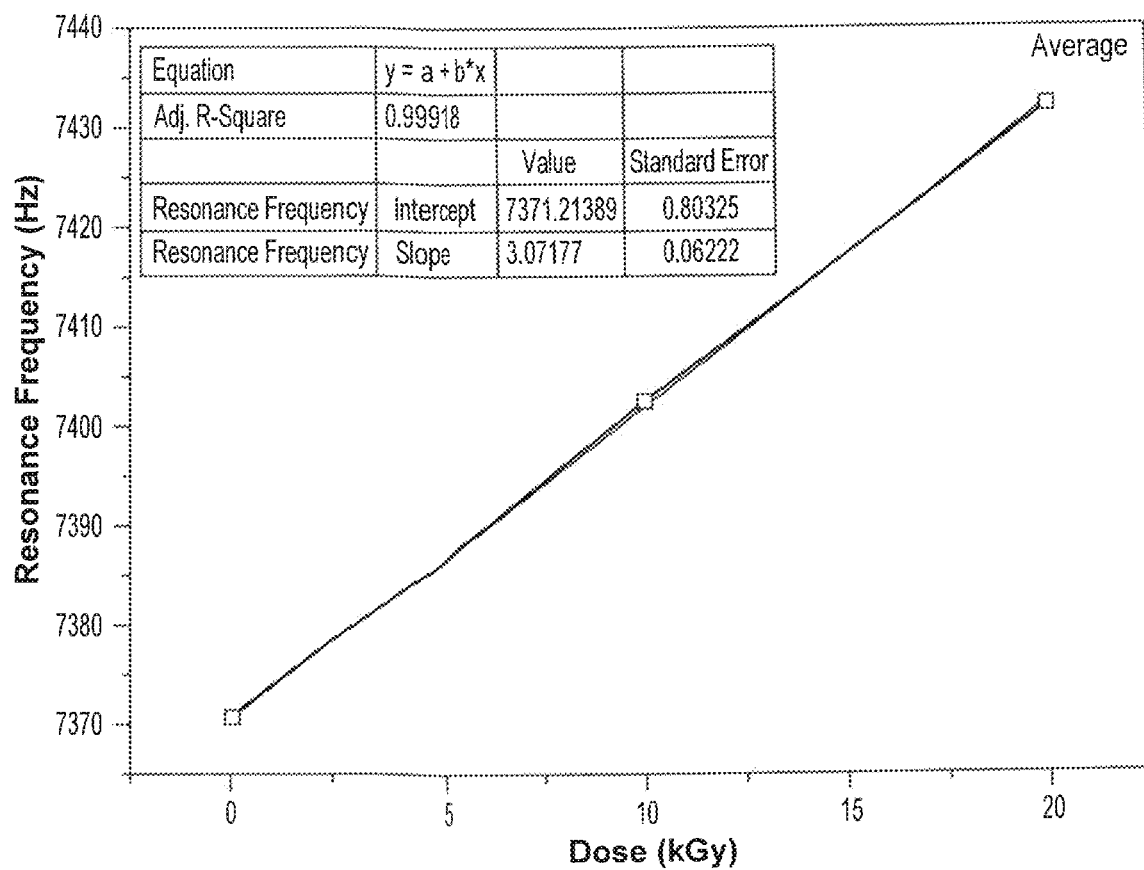
FIG. 5 shows resonant frequencies of $TiO_2$ thin film coated Si microcantilevers (CA6-8) and the average thereof under gamma irradiation doses from 0-20 kGy with a best fit trend line.
Figure 6A:
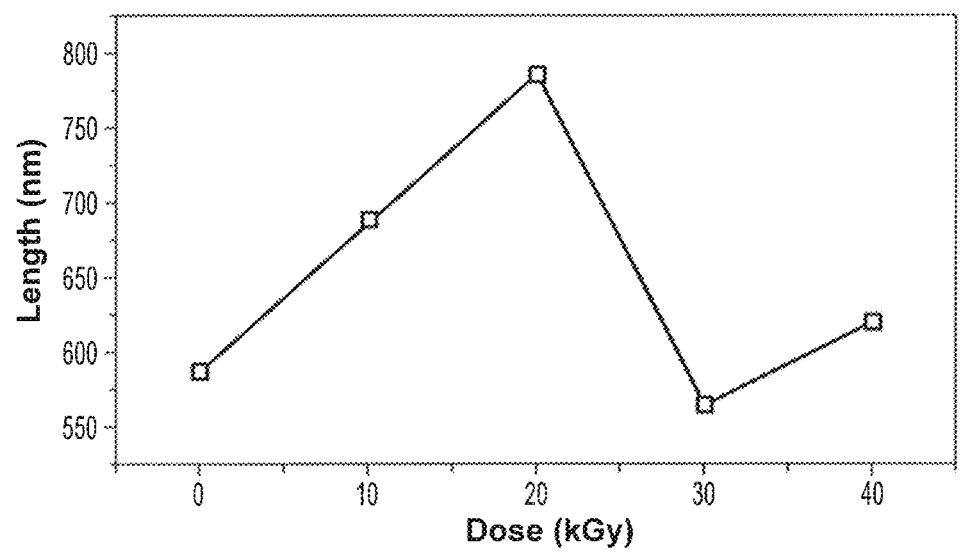
FIGS. 6A-6F show length (FIG. 6A), breadth (FIG. 6B), diameter (FIG. 6C), volume (FIG. 6D), height (FIG. 6E) and area (FIG. 6F), calculated from AFM images of $TiO_2$ thin films on Si substrates subject to radiation doses of 0 kGy (as-deposited), 10 kGy, 20 kGy, 30 kGy and 40 kGy.
Figure 6B:
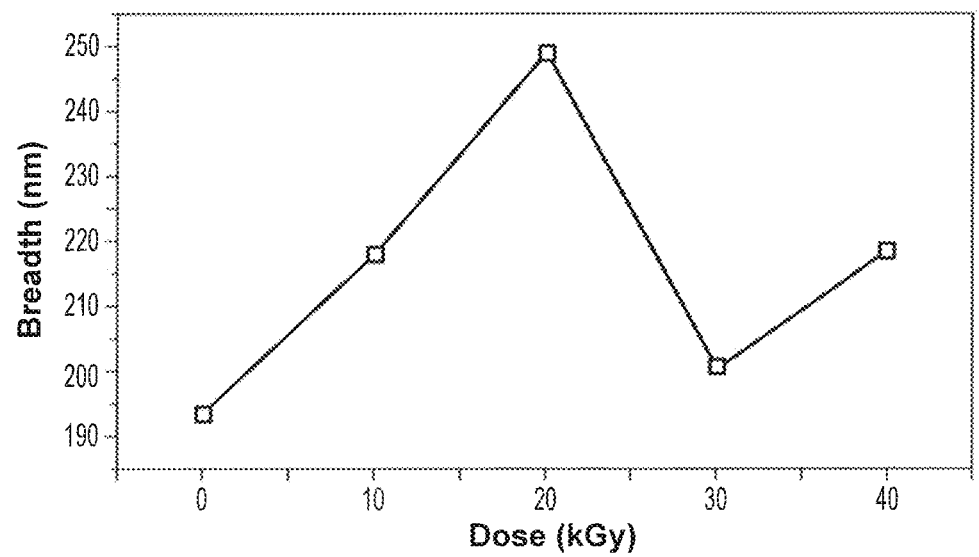
Figure 6C:
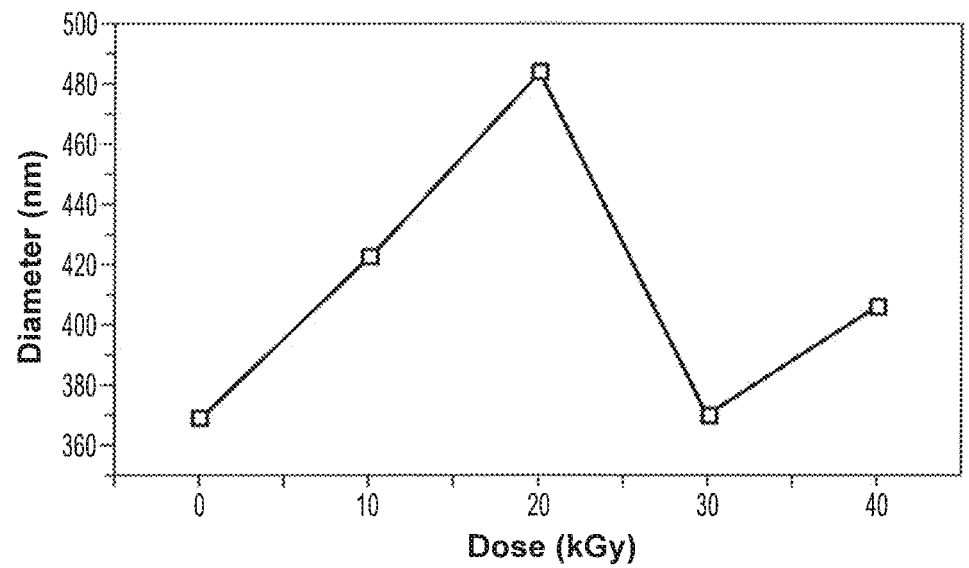
Figure 6D:
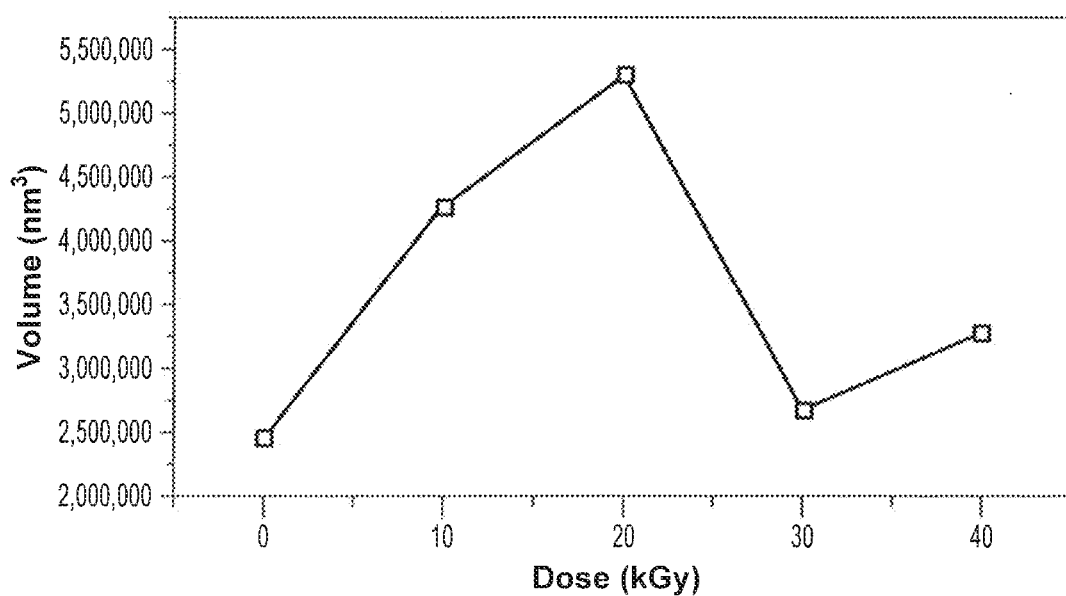
Figure 6E:
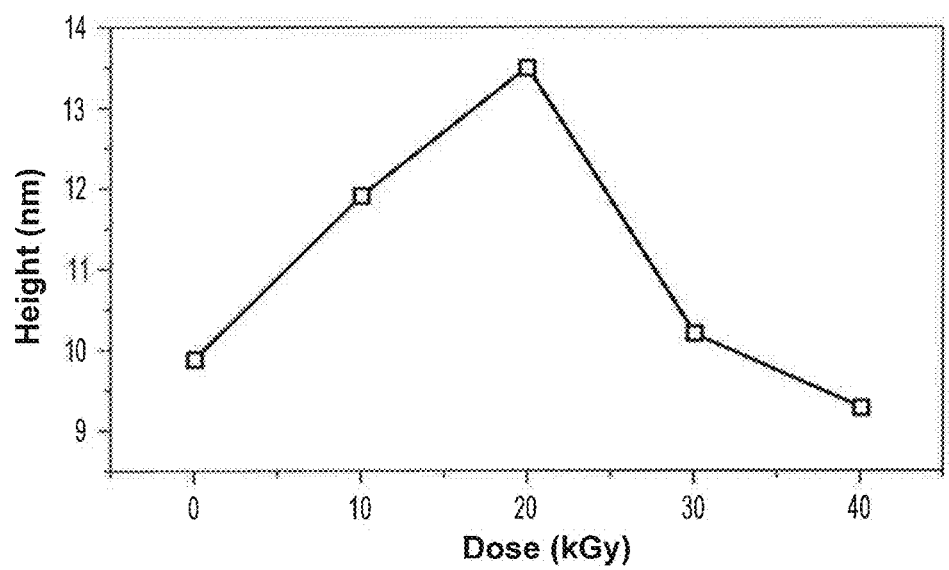
Figure 6F:
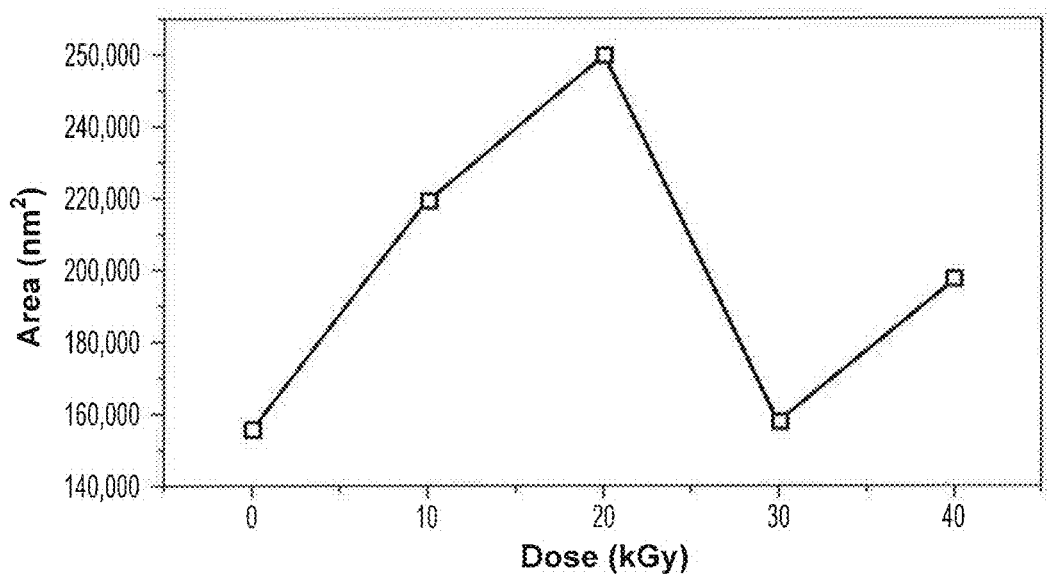

Resonant Frequency Shift Analysis:

AFM was used to find the resonant frequency shift ($\Delta f_o$) caused by changing the gamma dose from 0 to 40 kGy. The radiation was applied on the top of the microcantilevers coated with $TiO_2$, as shown in FIG. 2. Upon exposure to radiation, the microcantilever bends due to building surface stress, and the resonant frequency shifts due to changes in elastic properties of the $TiO_2$ thin film, presumably. To investigate the influence of the coating layer, the effects of 0 to 40 kGy gamma irradiation on five Si microcantilever (CA 1 to 5) without the coating layer ($TiO_2$) were studied. Results shown in FIG. 3 illustrated that there was no large radiation effect on resonant frequency for pure Si microcantilever, except for a slight increase in frequency at the 0.5 kGy dose. In other words, the behavior of Si in the absence of the coating layer was almost constant. As can be seen in FIGS. 4A-4D the behavior of $TiO_2$-coated microcantilever thin films under gamma irradiation doses is linear from 0 to 20 kGy. CA 1, CA 2 and CA 3 shows symmetrical response on all microcantilever used. The resonant frequency shifts monotonically with dosage for dosages of 20 kGy or less, and may stay shifted at higher dosages. This makes CAs coated with $TiO_2$ thin film a reproducible and accurate radiation dosimeter in low-dose applications. FIG. 5 shows the equation of the relationship between doses and resonant frequency with $R^2=0.99918$ from the average of three microcantilver 6, 7 and 8.

Structural Properties of the Exemplary $TiO_2$ Thin Films on Si Wafers:

AFM and SEM images obtained of Si wafers with $TiO_2$ thin films of the same thickness, deposition method and gamma irradiation doses applied on the Si microcantilever coated by $TiO_2$.

AFM Analysis of Structural Properties:

Scanning Probe Image Processor (SPIP) software was used to process AFM images taken over 10 μm×10 μm area to find surface roughness and changes in detected particle specification parameters such as length, breadth, diameter, volume, height and area for the as-deposited and irradiated $TiO_2$ thin films on Si wafers. FIGS. 6A-6F show changes in detected particle parameters for as-deposited and irradiated $TiO_2$ thin film samples at 10, 20, 30, and 40 kGy, respectively. All particle parameters respond proportionally to 0 to 20 kGy gamma radiation doses, similar to the results of FIGS. 4A-4D.

Table 1 represents the roughness of the $TiO_2$ thin films measured by AFM. The roughness increased linearly from ~17 nm for non-irradiated samples to ~19 nm for radiation doses of 20 kGy. Then, the surface improved partially with roughness ~18 nm at 30 kGy, for higher doses the surface becomes roughly about ~15.4 nm.

TABLE 1

Summary of the roughness measured by AFM, roughness measured by SE and best-fit parameters of the ellipsometric model of $TiO_2$ thin films after gamma radiation doses of 0-40 kGy

| Dose (kGy) | Roughness (AFM) (nm) | Roughness (SE) (nm) | Cauchy model parameters | | |
|---|---|---|---|---|---|
| | | | $A_n$ | $B_n$ | $C_n$ |
| 0 | 17.196 | 26.433 | 2.3093 | 0.0895 | −0.00925 |
| 10 | 17.84 | 26.456 | 2.3019 | 0.11054 | −0.01932 |
| 20 | 18.741 | 24.162 | 2.2832 | 0.13658 | −0.02671 |
| 30 | 18.067 | 26.643 | 2.3055 | 0.10044 | −0.01503 |
| 40 | 15.481 | 22.676 | 2.2739 | 0.16458 | −0.04121 |

Figure 7A:
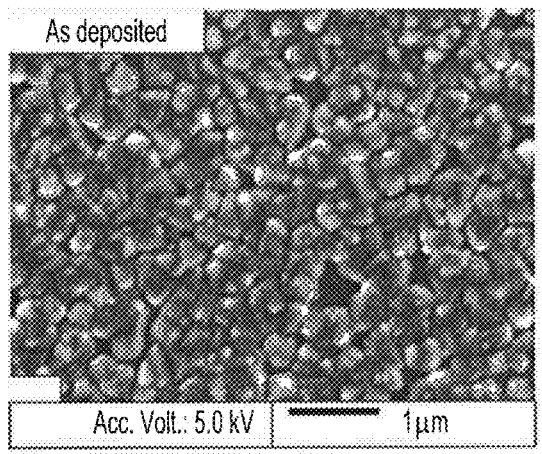
FIGS. 7A-7C show SEM micrographs of $TiO_2$ thin films on silicon wafers after radiation doses of 0 kGy (as-deposited) (FIG. 7A); 10 kGy (FIG. 7B); and 20 kGy (FIG. 7C).
Figure 7B:
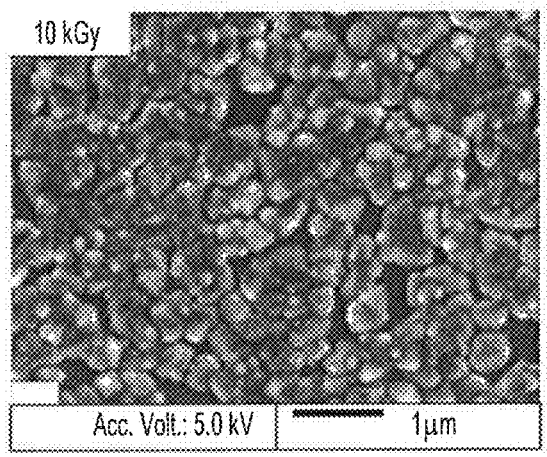
Figure 7C:
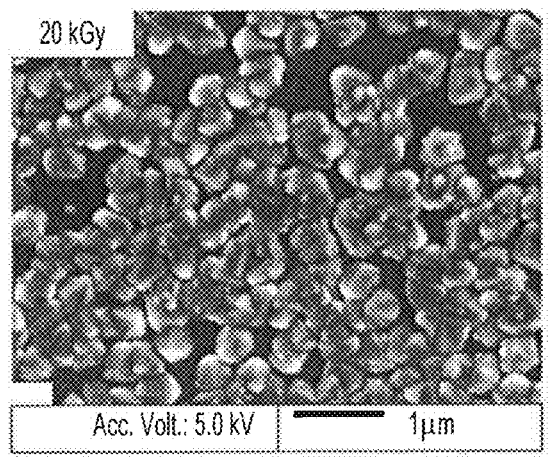

SEM Analysis of Structural Properties:

SEM micrographs of as-deposited and irradiated $TiO_2$ thin films are shown in FIGS. 7A-7C. Increased radiation dosage resulted in a proportional increase in visible pores, indicating a decrease in the grain size. The SEM micrographs are consistent with the AFM results for radiation dosages from 0 to 20 kGy.

Spectroscopic Ellipsometry Analysis:

Spectroscopic ellipsometry was performed using polarized light with an angle of incidence of 650 and 75° on the $TiO_2$ thin film samples prepared on silicon wafers. The Cauchy dispersion model was used to obtain best fit parameters Ψ, Δ and refractive index n. Specifically, these SE data were fit using the equation:

$$n(\lambda) = A_n + \frac{B_n}{\lambda^2} + \frac{C_n}{\lambda^4} \quad (2)$$

where λ is the incident light wavelength and $A_n$, $B_n$ and $C_n$ are Cauchy parameters. Spectroscopic ellipsometric measurements were performed on bare and $TiO_2$ thin film coated silicon wafers subjected to 0-40 kGy radiation doses.

Figure 8:
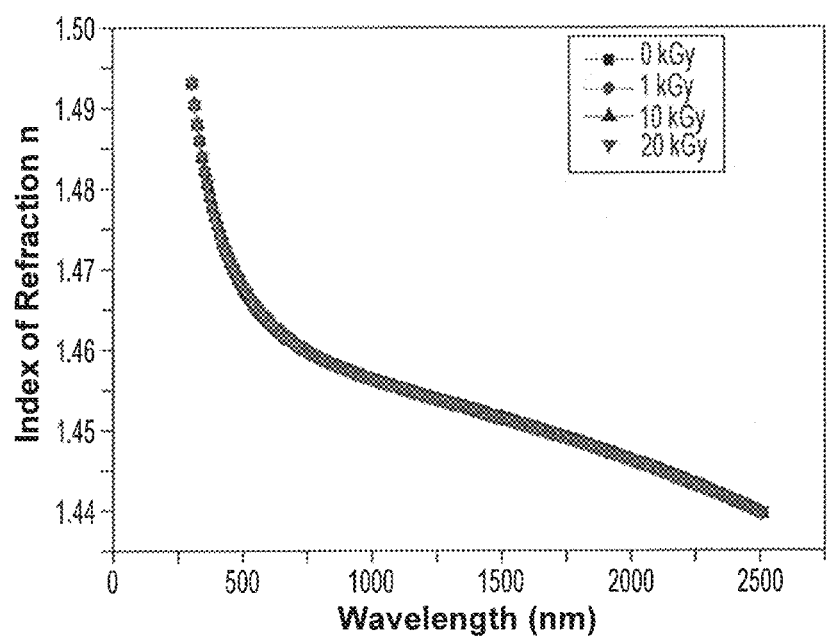
FIG. 8 is the refractive index (extracted from spectroscopic ellipsometry) for Si wafers, without $TiO_2$ thin film coating $TiO_2$, at radiation doses of 0 kGy, 1 kGy, 10 kGy and 20 kGy.
Figure 9:
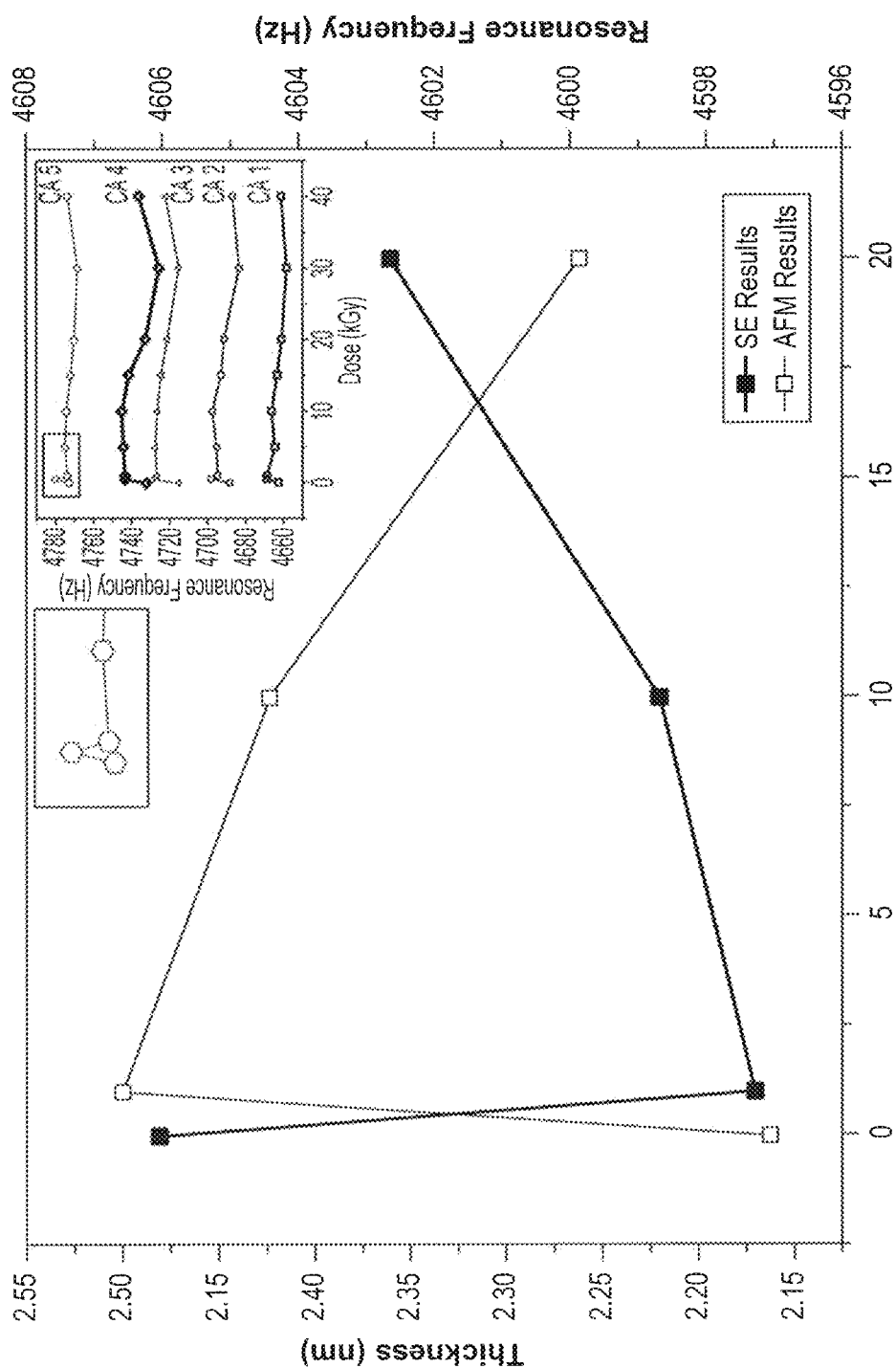
FIG. 9 shows changes in measured thickness of the native $SiO_2$ layer of uncoated silicon wafers, measured by spectroscopic ellipsometry, and resonant frequency of uncoated microcantilevers, determined by AFM (inset in FIG. 9 is FIG. 3).

SE Measurements of Si Wafers without $TiO_2$ Thin Film:

The optical constants of Si wafers without $TiO_2$ thin film at gamma radiation doses 0 kGy, 1 kGy, 10 kGy and 20 kGy were calculated. Each sample was assumed to consist of a Si substrate with a native $SiO_2$ layer. Measurements were performed using light over wavelengths from 124-2500 nm. Radiation of any tested dosage did not affect the optical properties of the control uncoated Si wafer, as can be observed in FIG. 8. However the thickness of native $SiO_2$ layer changed, as shown in FIG. 9. This change has a completely opposite behavior compared to the resonant frequency shift which was measured by AFM shown in FIG. 3 and FIG. 9.

The thickness change indicates a mass change, which is inversely related to frequency change. Therefore, the results shown in FIG. 9 are as expected.

Figure 10A:
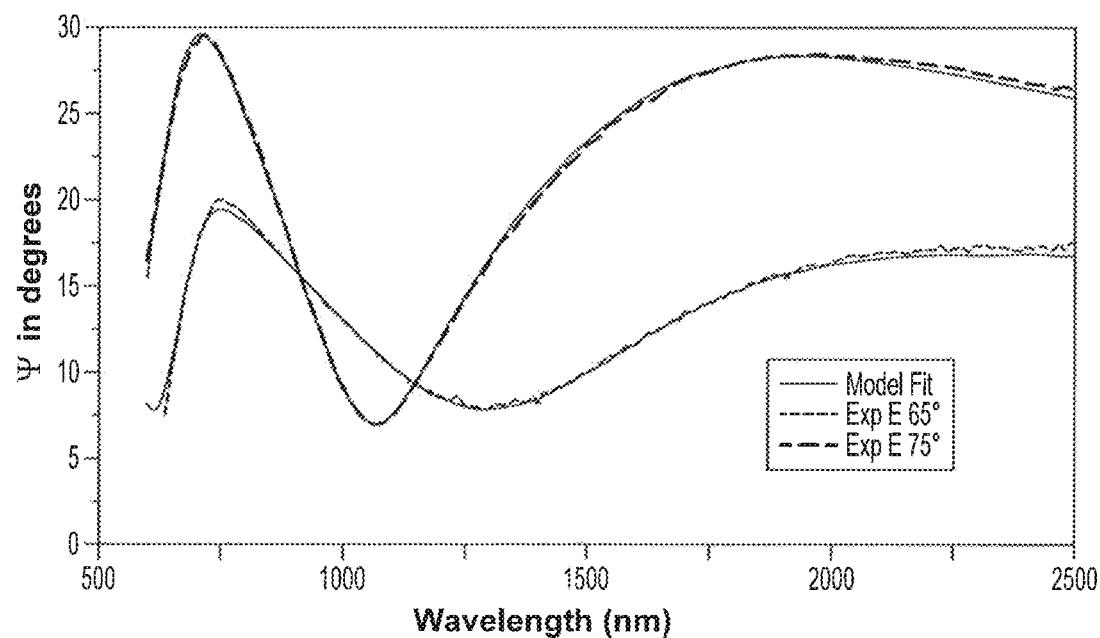
FIGS. 10A-10B depict spectroscopic ellipsometric measurements of Ψ (FIG. 10A) and Λ in degrees vs. wavelength (FIG. 10B) for $TiO_2$ thin films on Si wafers after 10 kGy radiation at an angle of incidence of 65 and 75 (inset in FIG. 10B shows the layering model used to analyze the ellipsometric data).
Figure 10B:
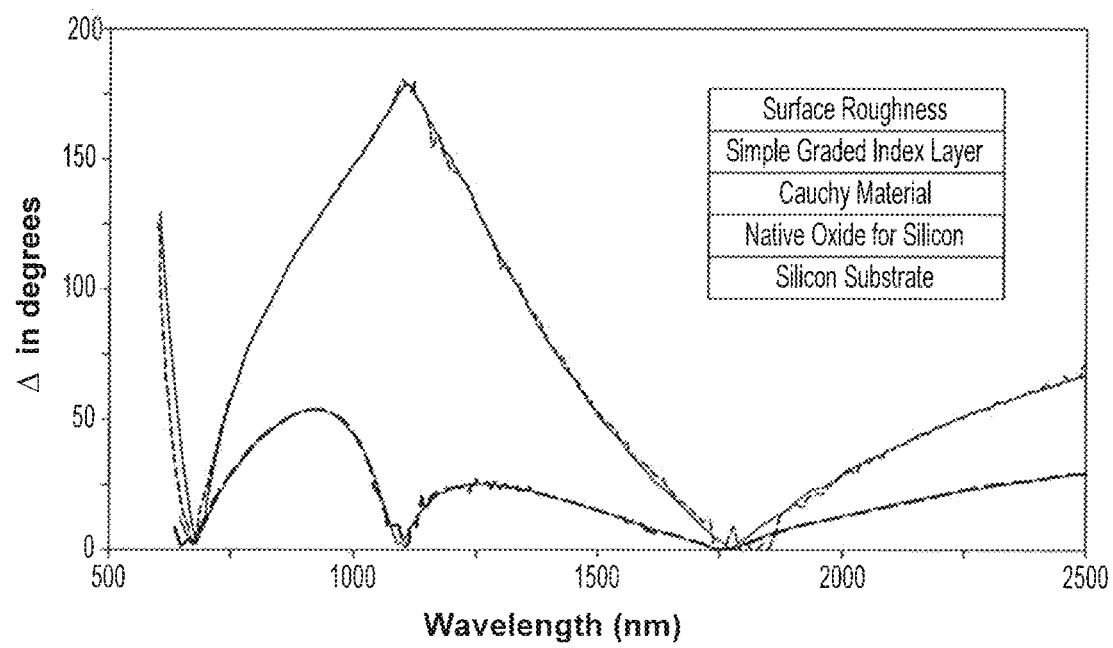

SE Measurements of Si Wafers with $TiO_2$ Thin Film:

Exemplary $TiO_2$ thin films were subjected to SE, as-deposited and irradiated at 10, 20, 30, and 40 kGy. The physical model assumptions used in fitting are shown in the inset of FIG. 10B. The thickness of the native oxide layer between the wafer and $TiO_2$ thin films was estimated with a value of 1 nm. A simple graded index layer was added to the Cauchy layer. The Fitted parameters are shown in Table 1. FIG. 10 shows generated and experimental data for Psi and delta measurements after $TiO_2$ thin film deposition exposed to 10 kGy and with angles of incidence of 65° and 75° on the $TiO_2$ front surface and over a wavelength range of (600-2500) nm. The model fits the experimental data well, showing the accuracy of the ellipsometry analysis and confirming the validity of the model assumptions. Other samples (i.e., exposed to 0, 20, 30 and 40 kGy) were similarly consistent between generated and experimental data.

Figure 11:
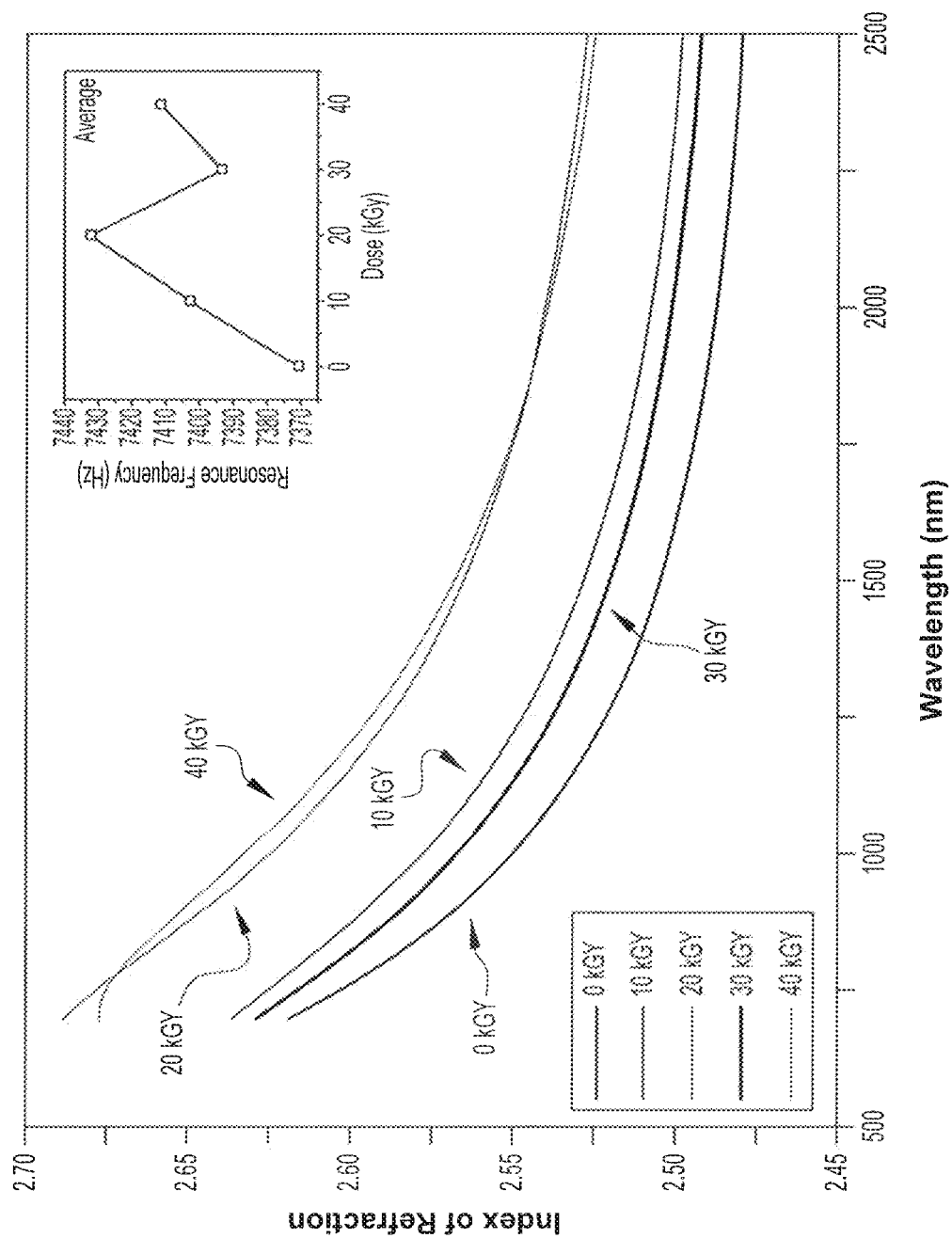
FIG. 11 depicts the dispersion spectra of the refractive index of the bottom layer of $TiO_2$ thin films on Si wafers with different radiation doses of 0 kGy, 10 kGy, 20 kGy, 30 kGy and 40 kGy (inset in FIG. 11 includes the average data shown in FIG. 4).

FIG. 11 shows the estimated spectral of refractive index of the samples subjected to different radiation doses. From the as-deposited thin films, the refractive index over the whole wavelength range increased gradually for radiation doses of 10 kGy and 20 kGy. The refractive index behavior with radiation dosage mirrors the resonant frequency of the bottom layer of exemplary $TiO_2$ thin film coated microcantilevers, as shown in the inset of FIG. 11.

Figure 12:
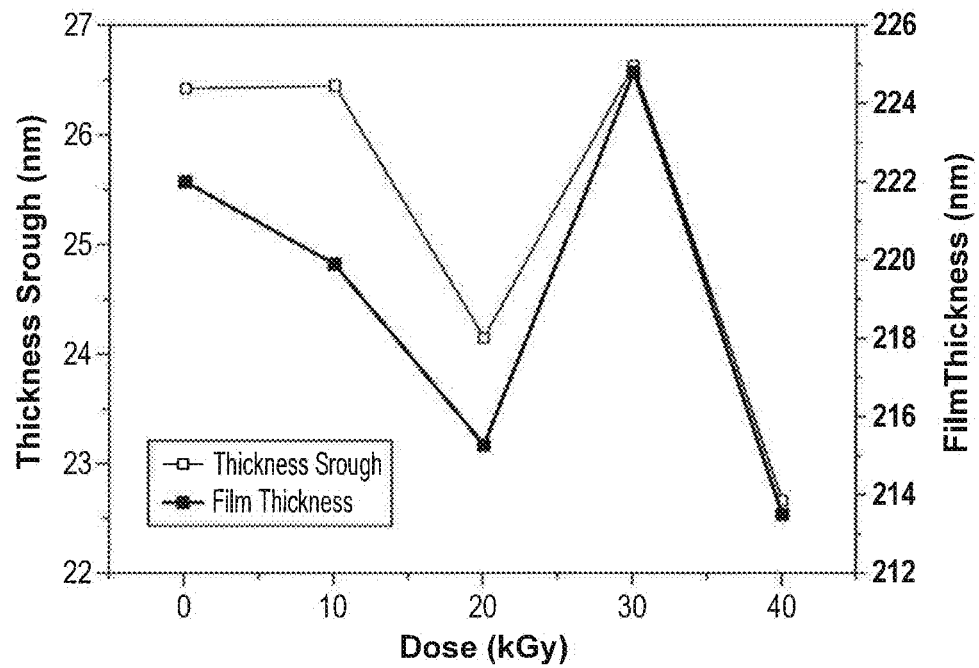
FIG. 12 depicts $TiO_2$ thin film thickness and the roughness following radiation doses of 0 kGy, 10 kGy, 20 kGy, 30 kGy and 40 kGy for $TiO_2$ thin films on silicon wafers determined by AFM.

The thickness and roughness, determined by SE, of the exemplary TiO$_2$ thin films subject to different radiation doses are shown in FIG. 12.

Figure 13:
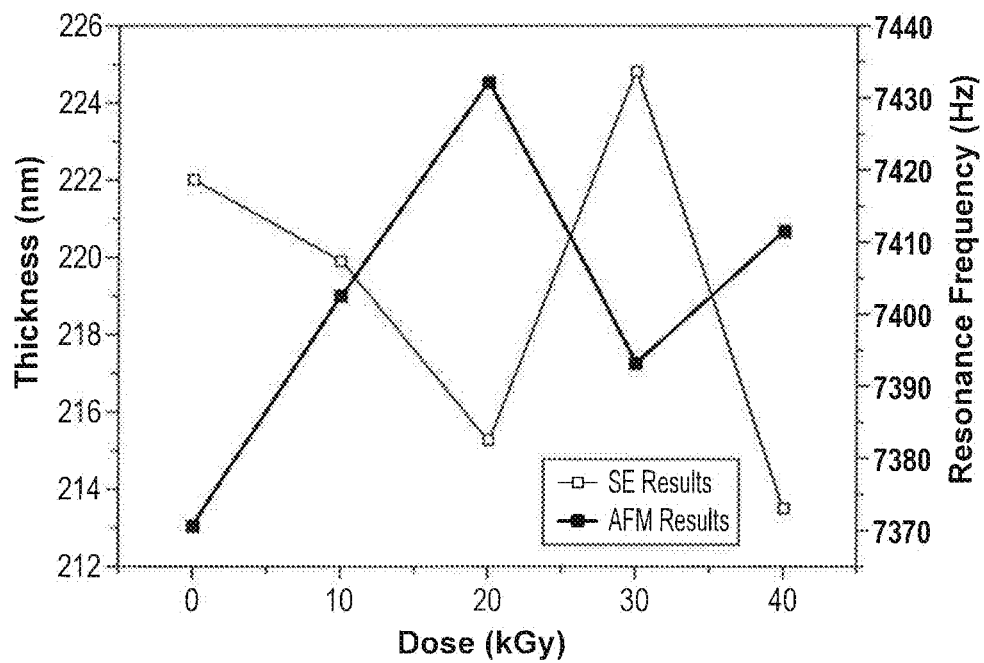
FIG. 13 depicts the thickness measurements of FIG. 12 with resonant frequency shifts of $TiO_2$ thin film coated microcantilevers measured by AFM.

FIG. 13 shows the film thickness of the simple graded index layer of the physical model, which has an inversely proportional relation to radiation dose as the resonant frequency of TiO$_2$ thin film coated microcantilevers at the same conditions. Again, the parameter thicknesses and roughness exhibit a linear relationship from 0 kGy to 20 kGy dosages. All results were taken following gamma radiation doses of 0 kGy, 10 kGy, 20 kGy, 30 kGy and 40 kGy.

Exemplary TiO$_2$ thin films were prepared by atomic layer deposition performed at 200° C. to a 100 nm thickness on silicon wafers and silicon cantilevers. The exemplary TiO$_2$ thin films and TiO$_2$ thin film coated microcantilevers, in particular, were reliable radiation detectors for a range of gamma ray dosages and were very reproducible, accurate and sensitive dosimeters for detection of gamma radiation between (0-20) kGy. XRD demonstrated that the exemplary TiO$_2$ thin films comprised a mixture of rutile and anatase phases before irradiation and changed to anatase phase after irradiation. This change was correlated with a linear resonant frequency shift with a radiation dose for dosages between (0-20) kGy. This linear change is consistent with structural changes in the exemplary TiO$_2$ thin films measured by spectroscopic ellipsometry, such as model film layer thicknesses and roughnesses. The above experiments control for the possiblitity of any contribution from the Si substrates, showing that the linear dose sensistive changes arise from the exemplary TiO$_2$ thin films. The exemplary MEMS dosimeter (TiO$_2$ thin film coated microcantilever) is particularly useful as, for example, personal dosimetric purposes.

It is to be understood that the metal oxide based radiation sensor and related methods are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A radiation sensor comprising:
   a substrate;
   a microcantilever having one end operatively coupled to the substrate; and
   a metal oxide layer arranged on a surface of the microcantiever,
   wherein the metal oxide layer comprises the metal oxide in at least one crystal form, the at least one crystal form being capable of transformation to a different form upon exposure to a radiation to be detected.

2. The radiation sensor of claim 1, wherein the metal oxide is titanium dioxide.

3. The radiation sensor of claim 2, wherein the at least one crystal form includes rutile.

4. The radiation sensor of claim 2, wherein the at least one crystal form includes rutile and anatase.

5. The radiation sensor of claim 2, wherein the microcantilever comprises a silicon based material.

6. The radiation sensor of claim 5, wherein the metal oxide layer has a first average thickness in a direction normal to the surface of the microcantilever on which the metal oxide layer is arranged and the microcantilever has a second average thickness in said direction, and the ratio of the first thickness to the second thickness is between 1:50 and 1:1.

7. The radiation sensor of claim 6 wherein the ratio of the first thickness to the second thickness is between 1:20 and 1:5.

8. The radiation sensor of claim 1, wherein the first thickness is uniform over the surface of the microcantilever on which the metal oxide layer is arranged.

9. The radiation sensor of claim 1, wherein the metal oxide layer comprises crystal grains having an initial grain size before exposure to the radiation to be detected and the crystal grains have a second grain size after exposure to the radiation to be detected, wherein the second grain size is smaller than the initial grain size.

10. A device comprising the radiation sensor of claim 1 and a structure for immobilizing the radiation sensor and enclosing the radiation sensor, the chamber being penetrable to the radiation to be detected.

11. The device of claim 10, wherein the chamber is configured to be worn on a person.

12. A method for detecting radiation exposure comprising steps of:
   measuring a detectable quantity of radiation in the radiation sensor of claim 1 to get a base value;
   exposing the radiation sensor to radiation;
   measuring the detectable quantity of radiation exposed to the radiation sensor to get an exposed value; and
   calculating a difference between the base value and the exposed value as a change in the detectable quantity of the radiation sensor.

13. The method of claim 12, wherein the detectable quantity is the resonant frequency of the microcantilever.

14. A method of fabricating a radiation sensor comprising:
   providing a microcantilever having one end coupled to a substrate; and
   coating a side of the microcantilever with a metal oxide layer,
   wherein the metal oxide layer comprises the metal oxide in at least one crystal form, the at least one crystal form being capable of transformation to a different form upon exposure to a radiation to be detected.

15. The method of claim 14, wherein the metal oxide layer is coated on the side of the microcantilever by means of atomic layer deposition.

16. The method of claim 14, wherein the metal oxide layer ranges from about 50 to about 200 nm thick.

* * * * *